Figure 1:
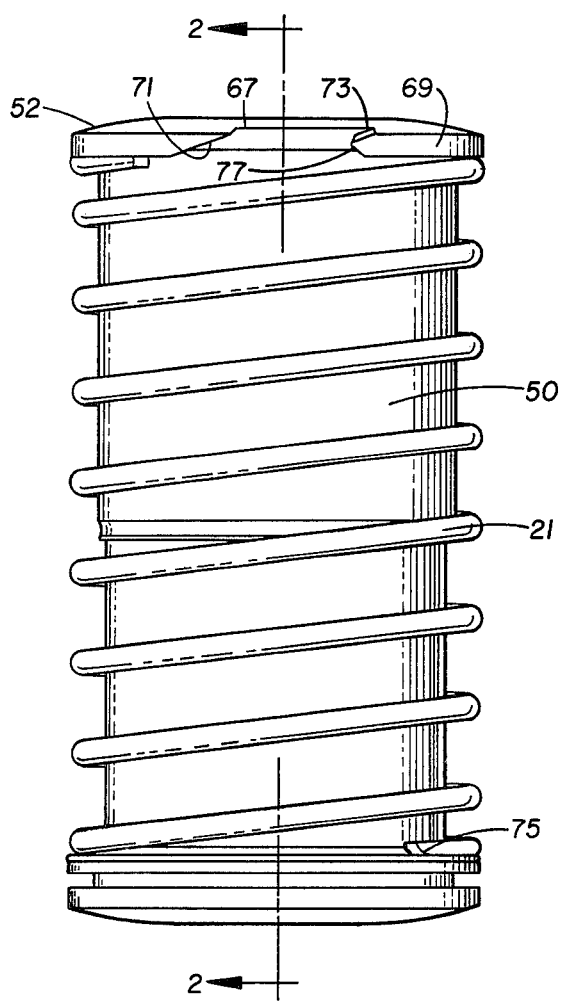

United States Patent [19]

Farris et al.

[11] 4,106,412

[45] Aug. 15, 1978

[54] FLUID TRUCK BOLSTER SNUBBER

[75] Inventors: Richard C. Farris, Joshua; William S. Butler, Burleson, both of Tex.

[73] Assignee: Halliburton Company, Duncan, Okla.

[21] Appl. No.: 679,620

[22] Filed: Apr. 23, 1976

[51] Int. Cl.² .................. B61F 5/12; B61H 11/00; F16F 9/24; F16F 9/38

[52] U.S. Cl. .................. 105/197 DH; 188/286; 267/8 R; 267/64 R

[58] Field of Search ............... 105/197 DH; 188/286, 188/287; 267/8 R, 64 R; 293/86

[56] References Cited

U.S. PATENT DOCUMENTS

| 3,444,965 | 5/1969 | Dobkins | 105/197 DH X |
|---|---|---|---|
| 3,464,366 | 9/1969 | Seay | 105/197 DH |
| 3,626,864 | 12/1971 | Wiebe | 105/197 DH |
| 3,831,529 | 8/1974 | Schwam | 105/197 DH |
| 3,833,248 | 9/1974 | Wössner et al. | 293/86 |
| 3,868,912 | 3/1975 | Wagner et al. | 105/197 DH |
| 3,874,307 | 4/1975 | Schwam | 105/197 DH |
| 3,931,961 | 1/1976 | Fader et al. | 267/64 R |

Primary Examiner—Drayton E. Hoffman
Assistant Examiner—Howard Beltran
Attorney, Agent, or Firm—John H. Tregoning; James R. Duzan

[57] ABSTRACT

A piston and cylinder motion dampening device having spiral groove metering, an orificed two-way pressure relief valve or a screw-on spring or an over-extension limiting seal retainer.

A push-together method of assembling a piston and cylinder motion dampening device.

A motion dampening device with a baffle chamber.

40 Claims, 12 Drawing Figures

U.S. Patent  Aug. 15, 1978  Sheet 1 of 3  4,106,412

FLUID TRUCK BOLSTER SNUBBER

This invention relates to a motion dampening device of particular suitability for reducing sway of railroad cars, and of particular suitability as a fluid truck snubber.

The state of the fluid truck snubber art is exemplified by U.S. Pat. Nos. 3,868,912 and 3,874,307. U.S. Pat. No. 3,868,912 describes a unit which includes a circumferential reservoir about a high pressure chamber, an annular orificed return flow valve, a separate central ball-type pressure relief valve, an internal piston-biasing spring and a discontinuously operable small diameter piston rod. U.S. Pat. No. 3,874,307 illustrates another snubber having the circumferential reservoir fed through the closed end of the cylinder rather than through the piston. An orificed pressure relief valve is used and a separate return valve. For background information on why fluid truck snubbers are useful in railway cars, reference is made to U.S. Pat. No. 3,464,366. For background information on alternative forms of truck snubbers, reference is made to U.S. Pat. No. 3,626,864 which includes a rather complete listing of prior art patents as well as a lengthy description of several approaches to the problem of excessive railway car sway. While a few of the above devices may solve the problem of railroad car sway with varying degrees of success, they are more complex and more costly than is desirable, both to manufacture and to maintain. The art has long had a need for a simpler, more reliable design. The current trend in the art is to provide discontinuous snubbing, because loaded and unloaded cars produce vastly different forces, and snubbers designed for heavy cars have traditionally been too stiff for unloaded cars. In this regard, reference is made to U.S. Pat. No. 3,831,529, wherein this problem is explained and sought to be solved by keeping the snubber out of contact with unloaded cars. The approach taken by those of even advanced skill in the art has been to design the snubber for loaded car conditions and maintain a clearance during unloaded conditions so that the snubber is made inoperative for unloaded cars. However, this requires an internal spring to restore the piston, which spring takes up space which could otherwise be filled by working fluid, and this further reduces the amount of space which can be used for the snubber itself. Also, those of skill in the art recognize there are forces even in unloaded and partially loaded cars which should be cushioned, especially those due to harmonic sway. Thus, even though the art has long felt a need for a snubber that is capable of proper cushioning of loaded, partially loaded and unloaded cars, those of even extraordinary skill in the art have not been able to develop a satisfactory solution.

Applicant has also realized that prior art snubbers have many internal parts, thus complicating assembly and maintenance and increasing manufacturing costs. Therefore, the art has a need for a snubber which reduces the number of internal parts.

Another problem of the prior art devices has been that the dusty environment of a railroad truck has reduced seal life due to abrasion of the seals, hence resulted in leaky units. The art has a need for a unit which minimizes the environmental damage to seals.

Most prior art devices have the high pressure chamber at the bottom end of the device in order to allow gravity to assist in keeping gases out of the high pressure chamber. Most prior art devices also have the reservoir at the bottom of the unit circumferentially surrounding the high pressure chamber. This causes the reservoir to move in unison with the railroad truck sideframe, which is the uncushioned object. It would be much more desirable to have a reservoir that moved in unison with the truck bolster, which is the cushioned object, so that reservoir agitation could be reduced. This would be especially so at relatively high train speeds where such agitation would be most pronounced.

Air entrainment has been an especially significant problem in many prior art devices and has traditionally been felt to require complex purging channels or purge valves, such as shown in U.S. Pat. Nos. 3,868,912 and 3,874,307. There is a need for a more simple solution to such air entrainment.

Those of advanced skill in the art realize that the internal valving is the heart of a snubber and is the most significant cost due to tight tolerances and complexity and the often high temperatures and abrasive action of fluid flowing therethrough during operation. The art therefore has a continual need for more durable, more compact and less costly valving.

A solution to these and other problems is provided by the method and apparatus of this invention which provides a movable piston; cylinder means for sealingly surrounding at least a portion of said piston; and spiral groove means, disposed between said piston and said cylinder means, for allowing regulated flow bypassing said piston within said cylinder.

Another aspect of the invention provides cylinder means for defining a high pressure chamber therein; piston means, movable within said cylinder means, for alternately contracting and expanding said high pressure chamber in response to forces applied to said piston means, reservoir means, connected to said high pressure chamber by a fluid passageway, for receiving fluid from said high pressure during contraction thereof and supplying fluid to said high pressure chamber during expansion thereof; valve means in said fluid passageway for regulating fluid flow therethrough, said valve means including: a valve member disposed in said fluid passageway; first passageway means through said valve member, for allowing flow from said high pressure chamber to said reservoir; second passageway means, through said valve member, for allowing flow from said reservoir to said high pressure chamber, said second passageway means having much greater flow capacity than said first passageway means, first closure means, within said first passageway means, for opening said first passageway means only in response to pressure in said high pressure chamber exceeding the pressure in said reservoir by a first predetermined magnitude and for closing said first passageway means at all lower pressures; second closure means, within said second passageway means, for closing said second passageway means in response to pressures in said reservoir exceeding the pressure in said high pressure chamber by a second predetermined magnitude, said first magnitude being much greater than said second magnitude; and third passageway means, in said valve member, for allowing restricted unvalved flow from said high pressure chamber to said reservoir.

A further aspect of the invention includes creating a circumferential opening in one of two axially spaced radial abutments; inserting an end of a spring into the opening; turning the spring so as to screw the spring through said opening and an operative position at least partially between the longitudinally spaced abutments; and maintaining the spring in said operative position.

A still further aspect of the invention provides a shock absorber, comprising a piston; cylinder means for circumferentially surrounding said piston to define a working chamber between said piston and one end of said cylinder; seal means, in an operative position between said piston and cylinder, for isolating said working chamber; dust cover means, connected to one of said piston and cylinder, for reducing the amount of dust contacting said seal means during operation of the shock absorber in a dusty environment; and retainer means, attached to said cylinder, for interlocking with said dust cover to prevent over-extension of the shock absorber, and for maintaining said seal means in said operative position.

Another aspect of the invention provides in an apparatus for dampening movements of a sideframe and bolster of a railroad truck of a railroad car relatively toward and away from one another, the improvement comprising: piston means, having a first end and a second oppositely facing end, for continuosuly contacting said bolster with said first end; cylinder means for continuously contacting said sideframe and for partially surrounding said piston means and for defining a high pressure chamber between said piston and cylinder means, said cylinder means having a first open end and a second end; and spiral groove means, disposed between said piston and cylinder means, for allowing metered flow within said cylinder bypassing said piston, said spiral groove means extending axially from a first point on an internal surface of said cylinder means adjacent said open end of said cylinder means to a second point a predetermined distance from said second end of said cylinder, said predetermined distance being equal to the distance of said second end of said piston from said second end of said cylinder when said apparatus is in operative position between said sideframe and bolster of said truck and said railroad car is fully loaded and stationary.

Yet another aspect of the invention provides a shock absorber comprising: a cylinder including: a cylinder wall having inner and outer peripheral surfaces and one open end; a piston telescopically received within said cylinder, said piston having a high pressure face in engagement with a body of fluid and a low pressure face; passage means, associated with said piston, for providing fluid communication between said high and low pressure faces of said piston; a reservoir in fluid communication with said low pressure face and intended to receive fluid which passes from the high pressure face of said piston through said passage means; return flow valve means, associated with said piston and adjacent said passage means, for increasing and decreasing flow through at least part of said passage means during motion of said piston away from and toward said body of fluid respectively; and baffle means, attached to said piston, for baffling fluid flow entering said reservoir from at least part of said passage means during motion of said piston toward said body of fluid.

A further aspect of the invention provides a single-acting shock absorber, comprising: variable volume high pressure chamber means for containing a fluid and for expanding and contracting responsive to movement of two spaced objects away from and toward each other respectively; fixed volume baffling chamber means, in restricted fluid communication with said high pressure chamber means, for receiving fluid from said high pressure chamber means during contraction of said high pressure chamber means and for slowing down the flow velocity of said received fluid following receipt thereof; fixed volume reservoir chamber means, in limited fluid communication with said high pressure chamber means, for receiving said slowed fluid from said baffling chamber means during contraction of said high pressure chamber means and for supplying fluid to said variable volume high pressure chamber means during expansion of said high pressure chamber; and valve assembly means for providing relatively more restricted fluid flow from said high pressure chamber means during contraction thereof and relatively less restricted flow into said high pressure chamber means during expansion thereof.

Another aspect of the invention provides a method of unidirectionally dampening the motion of two spaced objects relative to one another which comprises the steps of: (a) providing a liquid-full chamber between the two objects; (b) contracting and expanding said chamber responsive to movement of said two objects toward and away from one another respectively, thereby forcing liquid out of and into said chamber respectively; (c) directing said liquid flowing out of said chamber through a first fixed orifice responsive to flow rates, of said liquid out of said chamber, of less than a predetermined magnitude; (d) directing a substantial portion of said flow of said liquid through a second fixed orifice responsive to flow rates of said liquid out of said chamber, of at least equal to said predetermined magnitude, said second fixed orifice having substantially greater cross-sectional area than the cross-sectional area of said first fixed orifice.

Figure 2:
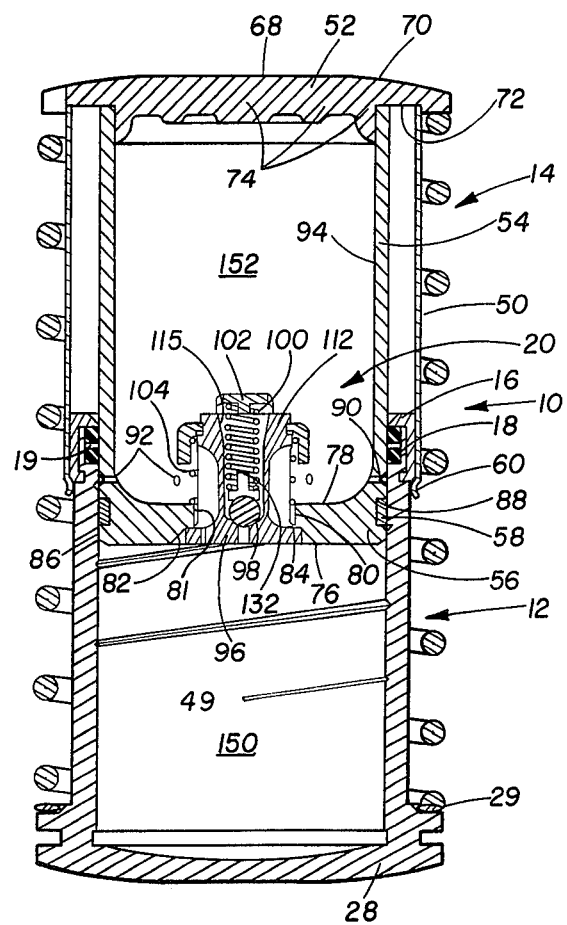
Figure 4:
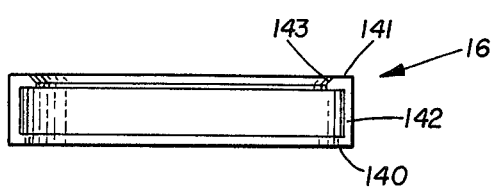
Figure 3:
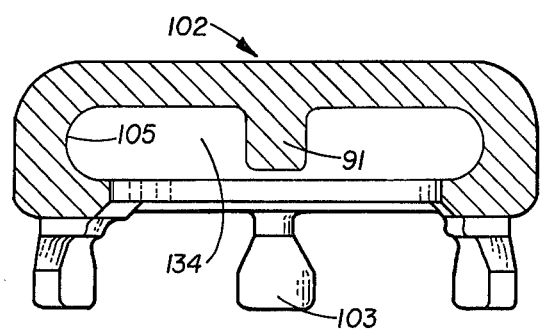
Figure 5:
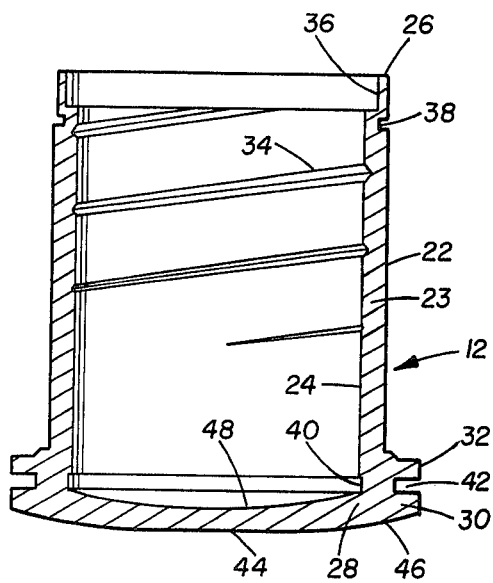
Figure 7:
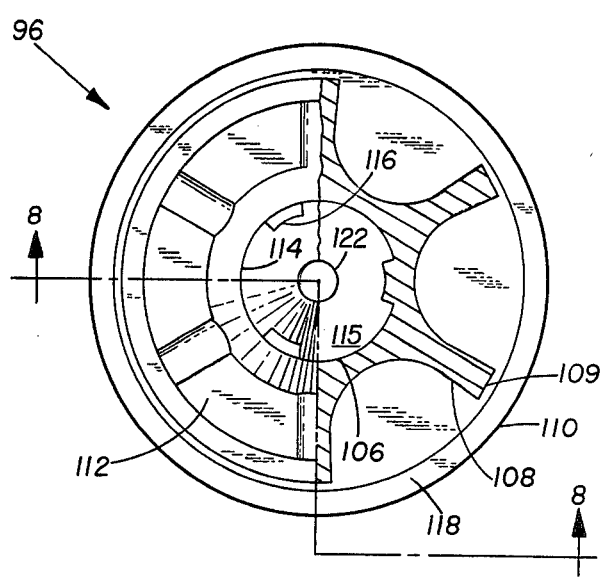
Figure 6:
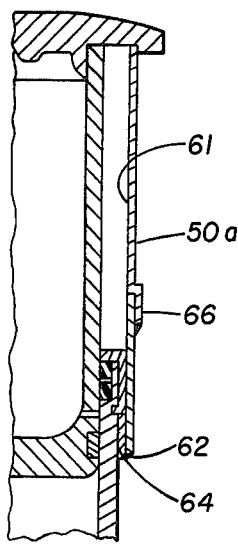
Figure 8:
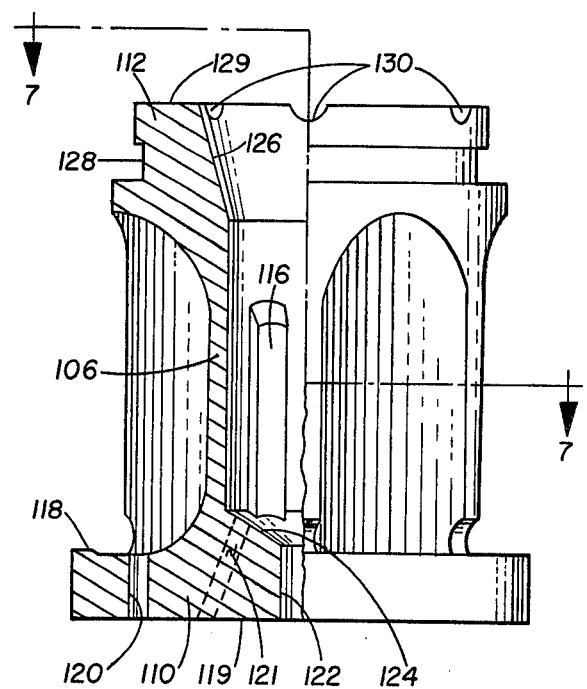
Figure 9:
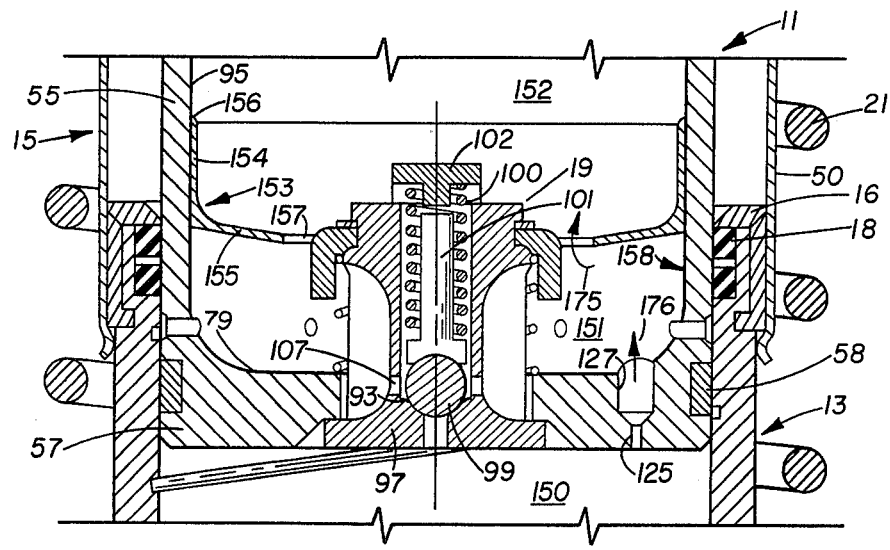
Figure 10:
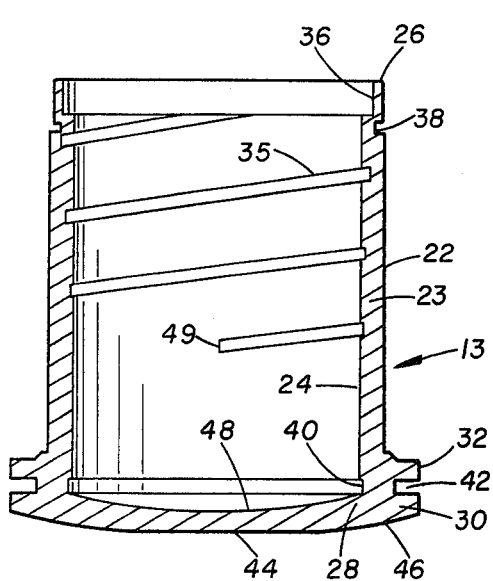
Figure 11:
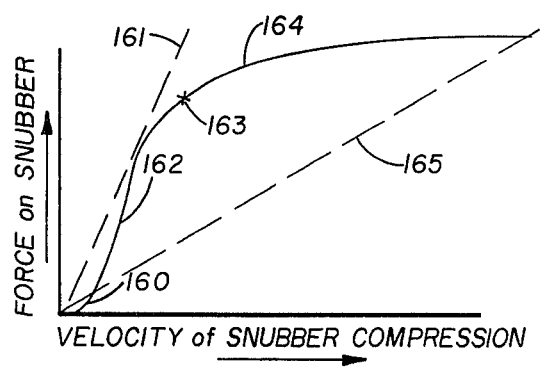
Figure 12:
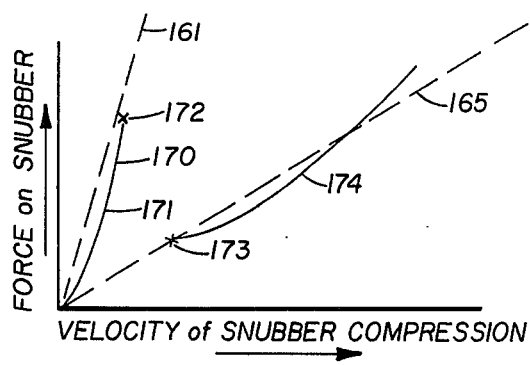

The invention, as well as objects and advantages thereof, can be more fully understood by reference to the following detailed description and attached drawings, which include:

FIG. 1, a vertical side view of a preferred fluid truck snubber;

FIG. 2, an elevational cross-sectional view of a first embodiment of the fluid truck snubber along lines 2—2 of FIG. 1;

FIG. 3, a vertical cross-sectional view of the valve cover of the snubber of FIG. 2;

FIG. 4, a vertical inside view of one of the retainers of the snubber of FIG. 1;

FIG. 5, an inside cross-sectional vertical view of the cylinder of the snubber of FIG. 1 showing vee notch spiral grooving;

FIG. 6, a vertical cross-sectional view of an alternate form of dust cover;

FIG. 7, a top partial sectional view of the valve body of the snubber of FIG. 1, taken along lines 10—10 of FIG. 11;

FIG. 8, an elevational partial sectional view taken along lines 11—11 of FIG. 10, showing the valve body of FIG. 10;

FIG. 9, an elevational cross-sectional view of a second embodiment of the snubber along lines 2—2 of FIG. 1;

FIG. 10, an inside vertical cross-sectional view of the cylinder of FIG. 5 showing rectangular spiral grooving;

FIG. 11, a graph showing the force-velocity curve for the snubber of FIG. 2; and FIG. 12, a graph showing the force velocity curve for the snubber of FIG. 9.

Referring to the drawings, which depict a preferred embodiment of the invention, there is shown in FIG. 1, a SWAY ARRESTOR ® spring cushioning system fluid truck snubber 10, which, as seen in FIG. 2, comprises cylinder 12, piston assembly 14, retainer 16, seals 18, valve assembly 20 and restoring spring 21. Snubber 10 is placed in a railroad car between the truck sideframe and bolster. For positioning, reference is made to U.S. Pat. No. 3,464,366, assigned to the assignee of this application, and to CAR AND LOCOMOTIVE CYCLOPEDIA, Centennial Edition (1974), page S13-53 (1974), which describes the governing AAR Standard Snubbed Spring Groups.

Cylinder 12 is cup-shaped and comprises (see FIG. 5) a cylindrical outer surface 22, a cylindrical wall 23 defined by inner surface 24 of a lesser diameter than surface 22, an open top end 26, an end cap 28 closing the bottom of cylinder 12, wear ring 29, external flanges 30 and 32 adjacent the juncture of wall 23 with end cap 28, spiral groove 34, an internal seal recess 36 and an external retainer recess 38 adjacent top end 26, and a cut-out 40. One preferred material for cylinder 30 would be ferrite ductile iron, although many other materials could be used instead. Surface 22 is of a diameter less than the internal diameter of restoring spring 21 while the outer diameter of flange 32 is sufficiently greater than the inner diameter of spring 21 to allow spring 21 to be axially restrained by flange 32. Flange 30 can be of identical outside diameter to flange 32 and is separated therefrom by a heat transfer recess 42. End cap 28 has a flattened convex bottom surface 44 and spherical edges 46 connecting bottom surface 44 with flange 30. This shape is used because it is the shape a completely spherical end cap would assume under operating conditions. End cap 28 also has a concave upper surface 48, to save metal, which is connected to cut-out 40 of wall 28. Spiral groove 34 axially spirals along surface 24 from seal recess 36 part of way axially down surface 24 to a point 49 above cut-out 40. A suitable axial distance has been found to be 3.25-3.75 inches, although this distance could be varied as necessary to provide variable stiffness for variable loading of railway cars. The length, depth, width and cross-section shape of the spiral groove could be varied, as could its cross-sectional configuration. The spiral groove is designed to provide the desired increases in stiffness (resistance to fluid flow during compression) as the snubber is compressed in response to increases in static loading of the railroad car, and thus point 49 would be located at the level on surface 24 where piston ring 58 would lie when the railroad car for which snubber 10 is designed was carrying maximum load. This would result in spiral groove 34 being operable to increase stiffness of the unit in response to increases in loading of the railroad car up until the railroad car was fully loaded at which time the spiral grooving would normally be closed.

Piston assembly 14 comprises dust cover 50, piston cover 52, piston wall 54, piston head 56 and piston ring 58. Dust cover 50 can be a thin tubular piece of stiff bendable material having an internal diameter greater than the outer diameter of retainer 16 and having a curved flange 60 at one end and firmly attached to piston cover 52 at its other end by welding, threads or other suitable attachment means. Alternately, to facilitate assembly of snubber 10 (see FIG. 6), dust cover 50 could be replaced by a modified dust cover 50a, comprising a metallic tube 61 and an abutment ring 64 threadedly connected or welded or brazed to tube 61, as shown at 62. Alternately, metallic tube 61 could be split, as at 66, to facilitate assembly of snubber 10, or some other suitable break in dust cover 50a could be made. Piston wall 54 is preferably of the same external diameter as piston head 56 and formed integral therewith as in FIG. 2. The upper end of piston wall 54 is affixed, such as by welding or threads, to piston cover 52. Piston cover 52 has a central flattened upper surface 68 with spherical edges 70. The lower surface of piston cover 52 includes a recess 72 for receiving the upper end of both dust cover 50 and piston wall 54, although separate recess could be used for each. Also, piston cover 52 can include ribs 74 for structural support. Outer surface 69 of piston cover 52 is provided with a lead-in recess 67 having circumferential lead-in surfaces 71 and 73 inclined relative to the axis of snubber 10 in the same direction as the inclination of spring 21 relative to snubber 10, so as to allow spring 21 to be screwed into position by insertion of lead end 75 of spring 21 into recess 67 and turning of spring 21. Surface 73 may be V-shaped to provide a rentention surface 77 to prevent unscrewing of spring 21. Piston head 56 includes a lower face 76 and upper face 78 and an axial passageway 80 connecting upper and lower faces 78 and 76. Passageway 80 is a circular axial passageway having an upper portion 81, tapered recess 82 at its lower end communicating with face 76, and a downwardly facing transverse seating shoulder 84. The outer surface 86 of piston head 56 include a radial recess 88 adapted to receive piston ring 58. Piston wall 54 also includes an external annular recess 90 above recess 88 of piston head 56, and one or more radial ports 92 communicating recess 90 with the internal surface 94 of wall 54.

Valve assembly 20 is axially located partly within passageway 80 and controls fluid flow therethrough. Valve assembly 20 includes return valve body 96, ball 98, a first spring 100, valve cover 102 and a second spring 104. Return valve body 96 (see FIGS. 2, 7 and 8) includes a valve tube 106, a valve disc 110, and an upper flange portion 112. Valve tube 106 has an external surface 109 of diameter less than the diameter of passageway 80. Valve tube 106 also has a cylindrical internal surface 114 defining in part an axial passageway 115 through return valve body 96. Passageway 115 can be provided with ball guides 116 which project inward radially from surface 114 to guide movement of ball 98 within passageway 115. Valve tube 106 also includes relief flutes 108 in the exterior surface 109 thereof. Disc 110 is attached to the bottom of valve tube 106 as by being cast integral therewith. Disc 110 has an external diameter greater than the diameter of passageway 80 of piston head 56 but less than the outer diameter of tapered recess 82. Disc 110 has an upper seating surface 118 adapted to sealingly engage seating shoulder 84 of piston head 56. Disc 110 is also provided with orifice 120 communicating one of relief flutes 108 with the bottom face 119 of disc 110. Alternatively, disc 110 could be provided with orifice 121 which communicates face 119 with passageway 115 in such a manner as to bypass ball 98 when ball 98 is in the closed position shown in FIG. 2. Disc 110 further includes axial relief opening 122 which communicates face 119 with passageway 115. Opening 122 is of a diameter less than passageway 115 but greater than orifice 120 (or 121). Opening 122 is coaxial with passageway 115 and is connected thereto by a relief valve seat 124, which is adapted to sealingly receive ball 98. Upper flange portion 122 includes an outwardly flared internal relief outlet surface 126 communicating the top surface 129 of flange 112 with passageway 115. Upper flange portion 112 also includes an external recess 128. The top surface 129 of flange 112 is provided with radial notches 130. Ball 98 is of diameter slightly less than the diametrical distance between ball guides 116 so as to slide therewithin. A ball pad 132 can be interposed between spring 100 and ball 98, if desired. Spring 100 is a coil spring of suitable design to achieve the desired opening ("cracking") pressure for flow through passageway 115 from relief opening 122. Spring 100 is held within passageway 115 by a valve cover 102 such as that shown in FIG. 3, or other suitable design providing a suitable flow opening 134 for exit of fluid from passageway 115. Valve cover 102 has a plurality of legs 103 sufficiently spaced to allow return flow through valve cover 102 into relief flutes 108 as described below. Valve cover 102 also has a radial opening 105 to provide an outlet for flow from passageway 115 as described below. Valve cover 102 further has a downwardly projecting boss 91 to position spring 100 and to limit travel of a rod 101 described below. Piston ring 58 preferably has a split therein to facilitate assembly and disassembly.

Seal 18 can be one of a number of conventional seals having an internal and external diameter to fit within recess 36 and sealingly abut wall 54.

Retainer 16 includes lower flange 140, upper flange 141 and body portion 142 therebetween and is semicircular in shape to facilitate assembly. Lower flange 140 has an internal diameter slightly greater than the inner diameter of recess 38 but less than the outside diameter of the top end 26 of cylinder 12, so as to be axially retained with said recess. Body portion 142 has an outside diameter slightly less than the inside diameter of cylinder portion 61 of dust cover 50 or 50a, so as to be radially restrained thereby. Upper flange 141 has an inside diameter less than the outer diameter of recess 36 and less than the outer diameter of seal 18 but greater than the outside diameter of wall 54 so as to retain seals 18 within recess 36. The upper surface may be tapered as at 143, if desired, to facilitate assembly and give slightly greater piston travel.

Looking to FIGS. 9 and 10 is seen an alternate snubber 11. Only the lower piston portion and cylinder 13 are shown since the remainder can be as shown in FIGS. 1, 2, 3, 4 and 6.

Modified piston assembly 15 head 57 is provided with an axial unvalved orifice 125 communicating with high pressure chamber 150 and optional counterbore 127 preferably in coaxial alignment with and communicating said orifice 125 with a baffle chamber 151 described below. Piston assembly 15 is also provided with a baffle member 153 which comprises an annular baffle ledge 155 and a ring shaped guide flange 154. Baffle ledge 155 is preferably inclined obliquely to guide flange 154 with guide flange 154 being formed integral with and extending upwardly from baffle ledge 155. Baffle member 153 is fixedly attached to internal surface 95 of piston wall 55 of piston assembly 15, as by welding 156 or brazing. Baffle ledge 155 is provided with a central opening 157 of diameter greater than the external diameter of valve assembly 19. This construction of modified piston assembly 15 creates a baffle chamber defined by the upper surface 79 of piston head 57, lower portion 158 of surface 95, baffle ledge 155 and valve assembly 19.

Cylinder 13 is the same as cylinder 12 except that rectangularly cross-sectioned spiral groove 35 is substituted for vee-notch spiral groove 34.

Valve assembly 19 is similar to valve assembly 20 except that the return valve body 97 has radial relief ports 107 and a travel limiter rod 101 to provide a fixed orifice when ball 99 unseats and to direct relief flow into baffle chamber 151. Rod 101 is of a length designed to allow movement of ball 99 upward a predetermined distance so as to define a fixed orifice between ball 99 and a seat 93 which can be identical to seat 124 previously described.

The assembly of snubber 10 will now be described. The individual parts are made as hereinabove described. Valve body 96 is then inserted into passageway 80 of piston head 56. Ball 98, ball pad 132 (or limite rod 101) and spring 100 are inserted into passageway 115, and second spring 104 is placed around surface 109 and flange 112. Then valve cover 102 is pressed into position and attached to flange 112 to compress spring 100 a predetermined amount and seat ball 98 on relief valve seat 124 and to compress second spring 104 a predetermined amount sufficient to hold the weight of valve assembly 20 so as to keep seating surface 118 and seating shoulder 84 engaged should the pressure on face 76 equal or exceed the pressure on surface 78. Wall 54 is then welded to the inner wall of recess 72, piston cover 52 and dust cover 50 are placed concentrically around wall 54 and welded to the outer wall of recess 72. Ring 58 is then placed into recess 88 to complete piston assembly 14. Seals 18 are placed within recess 36, along with a spacer 19. If an abutment ring 64 is used, it is slid over top end 26 of cylinder 12. The two semi-circular halves of retainer 16 are then inserted into recess 38 so as to hold seals 18 and spacer 19 within recess 36. Cylinder 12 is now filled with a predetermined amount of hydraulic fluid and piston assembly 14 is inserted into cylinder 12 and this partial snubber is compressed. Dust cover 50 snaps over retainer 16 to thereafter prevent accidental separation of piston assembly 14 from cylinder 12. Spring 21 is now screwed through lead-in recess 67 to a position between end cap 68 and flange 32. The assembly of snubber 11 can be identical except baffle member 153 is affixed to surface 95 before the piston cap is welded on.

The operation of snubber 10 will now be described. Snubber 10 is positioned within the spring basket of a railway car truck either in place of or in addition to an existing spring, as desired. Reference is made to FIGS. 3, 4 and 5 of U.S. Pat. No. 3,464,366 which show one such placement. Thereafter, snubber 10 will receive compressive forces in response to movements of a bolster toward the truck. Compression of snubber 10 forces the hydraulic fluid from a high pressure chamber 150 defined by surfaces 24, 48, 76, cut-out 40 and the bottom of valve body 96 through valve assembly 20 and spiral groove 34 into a reservoir 152 defined by surfaces 78 and 94, the bottom surface of piston cover 52 and the upper surface of valve assembly 20. If the compression is of low speed and the car is less than fully loaded, orifice 120 or 125 and spiral groove 34 or 35 control the flow from chamber 150 into reservoir 152 or baffle chamber 151. If the car is fully loaded, spiral groove 34 or 35 is closed. If the compression is of faster speed, orifice 120 or 125 and spiral groove 34 or 35 provide insufficient flow capacity to prevent a pressure buildup within high pressure chamber 150 of sufficient magnitude to cause ball 98 or 99 to lift off seat 124 or 93 and allow fluid to flow into reservoir 152 or baffle chamber 151 via passageway 115 or relief ports 107. When the truck and bolster move away from each other, restoring spring 21 causes an expansion of snubber 10. During an expansion, spring 21 pushes piston face 76 upward relative to high pressure chamber 150, thus creating a sufficient vacuum in chamber 150 to cause valve body 96 to be pulled downwardly against the bias of spring 104 to allow fluid to return from reservoir 152 or baffle chamber 151 to chamber 150.

Spiral groove 34 and 35 preferably extends only part way down surface 24 in order that an unloaded car can also be cushioned, thus overcoming the inability of the heretofore designed snubbers to adequately cushion both loaded and unloaded cars. The spiral groove is tapered so as to give an increase in resistance as the snubber is compressed at a rate below that which would cause ball 98 or 99 to unseat. The spiral groove also serves to increase fluid shear forces by lengthening the flow path by making the flow path move circumferentially as well as axially about ring 58 as ring 58 is moved through the part of surface 24 containing spiral groove 34 or 35. Recess 90 receives the flow from spiral groove 34 or 35 and ports 92 allow this received flow to pass into baffle chamber 151 or reservoir 152. Recess 90 and ports 92 also serve to prevent any pressure buildup between ring 58 and seals 18, since such buildup could cause leaks past seals 18 and thus necessitate some sort of fluid level check such as sight glasses. Thus the space located axially between seals 18 and ring 58 and radially between wall 54 and surface 24 is effectively made a part of reservoir 152, so that seals 18 only need resist low pressures, which helps avoid a leaky snubber in that seals 18 are dynamic seals.

With a loaded car, higher forces are to be expected and hence a stiffer snubber is needed, as the length of travel is more limited since the springs of the spring group will be compressed by the weight of the load and hence the bolster will be closer to the truck. Also, when swaying action occurs there are much greater forces involved as the center of gravity of the car is raised and the fulcrum effect therefore increased and the mass which is swaying is much greater. The taper of spiral groove 34 or 35 serves this purpose since as the car is loaded the snubber is also loaded and the cross-sectional area of the portion of spiral groove 34 or 35 adjacent to ring 58 is therefore reduced due to movement of ring 58 downward in cylinder 2 in response to the added weight of the load, which causes compression of the springs within the spring group of the truck. By appropriate positioning of point 49 and proper design of spiral groove 34 or 35, snubber 10 can thus be adapted to the loading of the railway car.

A further criteria is that snubber 10 have the proper speed response since there are two types of vertical forces put on the snubber. One is thought to be due to the harmonic motion which is induced when the natural rise and fall of the truck over the individual lengths of rail is in resonance with the natural frequency of the truck springs such that the track is rising while the springs are expanding, thereby producing an amplified upward movement. It will be appreciated that both loaded and unloaded cars have natural frequencies. Reference is made to FIGS. 1 and 2 of U.S. Pat. No. 3,464,366 in which a maximum force was found to be at 16–18 miles per hour, which is about the speed used in normal switchyard operations. A second type of force has been noted at speeds of over fifty miles per hour and is due to high speed passage over rail defects such as misaligned or irregular rails. While there may well be other critical speeds, these two are most critical in that the speeds are in a range likely to be constant for some time, whereas other speeds are normally only briefly passed through on accelerations and decelerations. To handle this problem, snubber 10 includes relief passageway 115 closed by ball 98 until a high rate of flow is required. By proper tapering of passageway 115 and proper design of seat 124 and spring 100, or alternatively by addition of relief ports 107 and proper limitation of the travel of spring 100, the proper pressure response can be created to cushion the high speed forces.

FIGS. 11 and 12 show the response of snubbers 12 and 13, respectively. Snubber 12 produces a continuous force-velocity curve 160 as seen in FIG. 11. The curve initially follows response line 161, which is a theoretically desired response to produce the optimum cushioning of harmonic motion which, as noted before, is most pronounced at relatively low train speeds and hence at low velocity of snubber movement. This first portion 162 of curve 160 is the response of orifice 120 and spiral groove 34. At somewhere in the vicinity of point 163, ball 98 begins to unseat and the response curve therefore flattens as the snubber flows more freely due to the variable orifice produced by the unseating of ball 98. Thus the final portion 164 response curve gradually approaches a second theoretical response line 165 which is the optimum cushioning response for the high speed bounce due to rail defects as noted before. Some prior art devices also have a curve somewhat like FIG. 11, if they have a variable orifice pressure relief valve.

FIG. 12, however, is a radical improvement. As snubber 13 is exposed to low velocity movement, it produces a steep initial portion 171 of the force-velocity response curve 170, much as with the initial curve 162 of FIG. 11. When a certain force is reached, as at point 172, ball 99 begins to unseat and as ball 99 unseats more area of ball 99 is exposed to differential pressure and ball 99 thus instantaneously fully opens to allow freer flow and the force-velocity curve 170 hence is discontinuous and drops to point 173 and assumes a new curve 174 governed by orifice 125 and the fully open orifice between ball 99 and seat 93. Since harmonic forces are the dominant consideration at low speeds and "bounce" forces due to rail defects are the dominant consideration at high speeds, a discontinuous curve such as 170 produces a much closer to ideal response than hitherto obtainable.

A further criteria is that the fluid snubber have a minimized air entrainment. It takes much less force to compress air bubbles in chamber 150 than it takes to force fluid through the orifices, hence such bubbles would harm the force-velocity relationships described above. The fluid discharging from orifices 120, 121 and 125 and openings 107 and 122 could do so at a relatively high velocity and disturb the air to oil interface within reservoir 152 and entrain air within the hydraulic fluid and has done so in some prior art devices. After a period of time an accumulated air entrainment in the system of snubber 10 would, as noted, decrease the snubber's cushioning ability. Therefore, it is desirable to include some means for preventing such air entrainment.

As one approach to air entrainment prevention, the hydraulic fluid used to fill cylinder 12 could be chosen so as to provide the most rapid release of air bubbles therein. Alternately, the flow from high pressure chamber 150 into reservoir 152 via orifices 120, 121 and 125 and openings 107 and 122 could be baffled by suitable baffling means such as spring 100 and valve cover 102 or a baffle chamber 151 designed to reduce the velocity of the fluid exiting the orifices while simultaneously preventing said fluid from contacting the air-oil interface until the velocity thereof has been substantially reduced. If baffle member 153 is used, it would preferably be sloped so that the outflow 175 would be at a point away from and below the impinging flow 176 to reduce the agitation of the reservoir 152. The downward slope would preferably be from about 5 to 30 degrees from horizontal.

Yet another approach would be to insert a floating piston at the air-oil interface, which could be loose fitting to prevent oil from being trapped thereabove. Yet another alternative would be to use orifice 121 and eliminate orifice 120, thereby forcing all orificed flow through passageway 115 and suitably baffling passageway 115 to substantially reduce fluid velocity during passage therethrough, as with a fine mesh screen or other baffle member.

With all of the above in mind, it will be understood that minor variations may be made without departing from the scope of the invention, and that the drawings merely describe preferred embodiments, not all possible embodiments, and therefore Applicant intends that all embodiments not departing from the scope of the invention be covered.

What is claimed is:

1. In a motion damping apparatus, the improvement comprising:
   a movable piston;
   cylinder means, for sealingly surrounding at least a portion of said piston; said cylinder means including end cap means for closing a first end, a second open end axially opposite to said first end, and an internal surface therebetween;
   a high pressure chamber between said closed end of said cylinder means and said piston;
   a reservoir on an opposite side of said piston from said high pressure chamber;
   two-way valve means, in said piston, for allowing relatively unrestricted flow from said reservoir into said high pressure chamber through said piston in response to a slightly lower pressure in said high pressure chamber than in said reservoir and for allowing relatively restricted flow from said high pressure chamber into said reservoir in response to a much higher pressure in said high pressure chamber than in said reservoir;
   spiral groove means, disposed between said piston and said cylinder means, for allowing regulated flow bypassing said piston within said cylinder means; and
   fixed diameter orifice means between said high pressure chamber and said reservoir for allowing regulated flow between said high pressure chamber and said reservoir.

2. The apparatus of claim 1, wherein said spiral groove means is of varied cross-sectional area so as to allow variable metered flow.

3. The apparatus of claim 2, wherein:
   said piston is sealingly surrounded by said open end of said cylinder means;
   said spiral groove means spirals axially upon said internal surface; and
   said spiral groove means is of decreasing cross-section in the direction from said open to said closed end of said cylinder means.

4. The apparatus of claim 1, wherein said piston further comprises:
   annular recess means, in an external wall of said piston, for communicating with said spiral groove;
   a reservoir within said piston; and recess port means, in said piston, for providing fluid communication between said recess means and said reservoir.

5. The apparatus of claim 4, wherein said recess port means has a greater total cross-sectional area than the maximum cross-sectional area of said spiral groove means, whereby said fluid communication is less restricted than said regulated flow through said spiral groove means.

6. The apparatus of claim 4, wherein:
   said piston further comprises ring means thereon for providing at least partial sealing between said piston and said cylinder while allowing flow therebetween through said spiral groove means;
   said cylinder means has seal means, adjacent said open end, for sealing said piston within said cylinder means;
   said spiral groove means is axially disposed at least partially toward said open end of said cylinder means from said ring means and is entirely disposed axially toward said closed end of said cylinder means from said seal means; and
   said annular recess means and recess port means are axially disposed between said seal means of said cylinder means and said ring means of said piston means.

7. The apparatus of claim 1, wherein:
   said cylinder means has seal means, adjacent said open end, for sealing said piston within said cylinder means; and
   said spiral groove means extends axially toward said closed end from a first point on an internal surface of said cylinder means toward said closed end from said seal means to a second point a predetermined axial distance from said closed end.

8. The apparatus of claim 7, wherein said first point is adjacent said seal means.

9. The apparatus of claim 1, wherein:
   said spiral groove means extends from a first point on an internal surface of said cylinder means, toward said closed end from said seal means, axially to said closed end.

10. The apparatus of claim 9, wherein said first point is adjacent said seal means.

11. The apparatus of claim 1, wherein said valve means and said reservoir are coaxial.

12. The apparatus of claim 1, wherein said two-way valve means includes said fixed diameter orifice means between said high pressure chamber and said reservoir.

13. The apparatus of claim 12, wherein said apparatus includes baffling means for preventing direct impingement of fluid outflow from said orifice upon any air-liquid boundary of said apparatus.

14. The apparatus of claim 1, wherein said cylinder means includes seal means, within a common recess of a radially internal portion of said open end of said cylinder means; and retainer means for longitudinally overlying said open end of said cylinder and retaining said seal means within said recess.

15. The apparatus of claim 14, wherein said seal means includes a plurality of separated annular sealing elements.

16. The apparatus of claim 14, where said retainer means is attached to a radially external portion of said cylinder means.

17. The apparatus of claim 14, wherein:
   said retainer means further includes an abutment; and said piston includes axial restraint means, connected to said piston, for abutting said abutment means and preventing axial movement of said piston axially out of said cylinder means.

18. The apparatus of claim 17, wherein said axial restraint means further includes stiff bendable dust cover means for isolating said seals from external dust and debris.

19. The apparatus of claim 1, further comprising end cap means, attached to said piston and said cylinder means to form elements continuously contacting spaced reciprocating surfaces to damp the movement thereof.

20. The apparatus of claim 19, wherein said end caps have a flattened central portion and spherical edges so as to reduce structural alteration due to wear.

21. The apparatus of claim 1, wherein said piston includes a rod portion having an external diameter slightly less than the smallest internal diameter of the lower portion of said cylinder means.

22. A single acting motion dampening device, comprising:
cylinder means for defining a high pressure chamber therein;
piston means, movable within said cylinder means, for alternately contracting and expanding said high pressure chamber in response to forces applied to said piston means;
spiral groove means, disposed between said piston means and said cylinder means, for allowing regulated flow bypassing said piston means within said cylinder means;
reservoir means, connected to said high pressure chamber by a fluid passageway, for receiving fluid from said high pressure chamber during contraction thereof and supplying fluid to said high pressure chamber during expansion thereof;
valve means in said fluid passageway for regulating fluid flow therethrough, said valve means including:
a valve member disposed in said fluid passageway;
first passageway means through said valve member, for allowing flow from said high pressure chamber to said reservoir;
second passageway means, through said valve member, for allowing flow from said reservoir to said high pressure chamber, said second passageway means having much greater flow capacity than said first passageway means;
first closure means, within said first passageway means, for opening said first passageway means only in response to pressure in said high pressure chamber exceeding the pressure in said reservoir by a first predetermined magnitude and for closing said first passageway means at all lower pressures;
second closure means, within said second passageway means, for opening said second passageway means in response to pressures in said reservoir exceeding the pressure in said high pressure chamber by a second predetermined magnitude, said first magnitude being much greater than said second magnitude; and
third passageway means, in said valve member, for allowing restricted flow from said high pressure chamber to said reservoir.

23. The apparatus of claim 22, wherein said valve member is located in said piston.

24. The apparatus of claim 22, wherein said valve member is located in the center of the end of said piston closest to said high pressure chamber.

25. The apparatus of claim 22, wherein said third passageway means is separated from said first passageway means.

26. The apparatus of claim 22, wherein said third passageway means communicates with said first passageway means at a point toward said reservoir from said second closure means.

27. The apparatus of claim 22, wherein said first passageway means includes:
an inlet section of a first diameter in continuous communication with said high pressure reservoir;
an outlet section, of a second diameter greater than said first diameter, in continuous communication with said reservoir; and
a valve seat between said outlet and inlet sections facing toward said outlet section.

28. The apparatus of claim 27, wherein:
said first closure means includes a ball adapted to sealingly seat in said valve seat, and biasing means, associated with said ball, for urging said ball to seat in said valve seat.

29. The apparatus of claim 27, wherein said outlet section is of varying diameter so as to provide a meter effect between said closure means and said outlet section.

30. The apparatus of claim 29, wherein said first closure means includes a ball adapted to sealingly seat in said valve seat and biasing means, associated with said ball, for urging said ball to seat in said valve seat.

31. The apparatus of claim 22, further comprising:
baffling chamber means, forming a part of said reservoir means, for receiving impinging fluid exiting from at least one of said first and third passageway means and for reducing the flow velocity of said received fluid to directly impinge only upon a surface covered by fluid.

32. A shock absorber, comprising:
a piston;
cylinder means surrounding said piston, defining a working chamber between said piston and one end of said cylinder means and having a recess therein at the other end of said cylinder means;
seal means, between said piston and cylinder, for isolating said working chamber;
said seal means installed in the recess at the other end of said cylinder means;
dust cover means, connected to said piston, for reducing the amount of dust contacting said seal means during operation of the shock absorber in a dusty environment;
said dust cover means comprising:
a thin tubular piece of material having a flange at one end thereof while the other end is secured to said piston; and
retainer means, attached to said cylinder, for interlocking with the flange of said dust cover to prevent over-extension of the shock absorber, and for maintaining said seal means in said operative position in the recess at the other end of said cylinder means.

33. A fluid shock absorber, comprising:
a piston;
cylinder means surrounding a portion of said piston, defining working chamber between said piston and one end of said cylinder means and having a recess therein at the other end of said cylinder means;

seal means, for isolating said working chamber;

said seal means installed in the recess at the other end of said cylinder means;

retainer means, attached to a portion of said cylinder, for retaining said seal means in an operative position; and limit means, attached to said piston, for abutting said retainer means to prevent over-extension of said piston relative to said cylinder, said limit means having a greater internal diameter than the external diameter of said portion of said cylinder.

34. The fluid shock absorber of claim 33, wherein said limit means comprises:

a first portion affixed to said piston; and a second portion, releasably connected to said first portion, having an internal diameter less than the external diameter of said retainer means.

35. A shock absorber comprising:

a cylinder including:

a cylinder wall having inner and outer peripheral surfaces and one open end;

a piston telescopically received within said cylinder, said piston having a high pressure face in engagement with a body of fluid and a low pressure face;

spiral groove means, disposed on the inner peripheral surface of said cylinder wall for allowing regulated fluid flow bypassing said piston within said cylinder;

passage means, associated with said piston, for providing fluid communication between said high and low pressure faces of said piston, said passage means comprising:

valve means for allowing relatively restricted fluid flow from the high pressure face to the low pressure face of said piston; and fixed diameter orifice means between the high pressure face and low pressure face of said piston for allowing regulated fluid flow between the high pressure face and low pressure face of said piston;

a reservoir in fluid communication with said low pressure face and intended to receive fluid which passes from the high pressure face of said piston through said passage means;

return flow valve means, associated with said piston and adjacent said passage means, for increasing and decreasing fluid flow through at least part of said passage means during motion of said piston away from and toward body of fluid respectively; and baffle means, attached to said piston, for baffling fluid flow entering said reservoir from at least part of said passage means during motion of said piston toward said body of fluid.

36. The apparatus of claim 35, wherein: said baffle means includes:

primary baffle means, within said reservoir means, for dividing said reservoir into a baffled chamber and an unbaffled chamber, and for limiting communication between said baffled and unbaffled chamber and for receiving flow from said orifice means into said reservoir.

37. The apparatus of claim 36, wherein said baffle means further includes:

secondary baffle means, within said baffled chamber for overlying said orifice and redirecting flow from said orifice means.

38. The apparatus of claim 35, wherein:

said piston includes portions fully enclosing and defining said reservoir.

39. The apparatus of claim 38, wherein:

said portions include a wall with a cylindrical inner surface; and said baffle means projects radially inwardly and slopes axially toward said high pressure surface from said cylindrical inner surface of said piston to overlie said orifice means.

40. The apparatus of claim 35, wherein:

said return flow valve means is attached to said piston and lies partially within a portion of said passage means and projects into said reservoir; and said baffle means is attached to said piston means and projects into said reservoir means, a predetermined distance from said projecting portion of said return flow valve means to define an annular flow opening therebetween, said flow opening being of substantially greater cross-sectional area than said passage means during movement of said piston toward said body of fluid.

* * * * *

UNITED STATES PATENT AND TRADEMARK OFFICE
CERTIFICATE OF CORRECTION

PATENT NO. : 4,106,412

DATED : August 15, 1978

INVENTOR(S) : Richard C. Farris and William S. Butler

It is certified that error appears in the above-identified patent and that said Letters Patent are hereby corrected as shown below:

In column 4, line 53, delete the numbers "10-10" and insert --7-7--; line 54, delete the number "11" and insert --8--; line 56, delete the numbers "11-11" and insert --8-8--; and line 57, delete the number "10" and insert --7--.

Signed and Sealed this

Sixteenth Day of December 1980

[SEAL]

Attest:

SIDNEY A. DIAMOND

*Attesting Officer*     *Commissioner of Patents and Trademarks*